United States Patent
Sheran et al.

(10) Patent No.: US 11,869,115 B1
(45) Date of Patent: Jan. 9, 2024

(54) DENSITY DRIVEN VARIABLE RATE SHADING

(71) Applicant: QUALCOMM Incorporated, San Diego, CA (US)

(72) Inventors: Alec Matthew Sheran, Franklin, MA (US); Tate Hornbeck, Cambridge, MA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/816,362

(22) Filed: Jul. 29, 2022

(51) Int. Cl.
*G06T 1/20* (2006.01)
*G06T 11/40* (2006.01)

(52) U.S. Cl.
CPC ............. *G06T 1/20* (2013.01); *G06T 11/40* (2013.01)

(58) Field of Classification Search
None
See application file for complete search history.

(56) References Cited

U.S. PATENT DOCUMENTS

| 11,790,479 B2 * | 10/2023 | Langtind | G06T 11/203 |
| | | | 345/441 |
| 2017/0293995 A1 * | 10/2017 | Saleh | G06T 1/60 |
| 2019/0035049 A1 * | 1/2019 | Backer | G06T 15/005 |
| 2021/0110509 A1 | 4/2021 | Howson et al. | |
| 2021/0192827 A1 | 6/2021 | Saleh et al. | |
| 2023/0306661 A1 * | 9/2023 | Stepuch | G06T 1/60 |
| | | | 345/522 |
| 2023/0326134 A1 * | 10/2023 | Boben | G06T 15/005 |
| | | | 345/423 |

FOREIGN PATENT DOCUMENTS

| EP | 3349181 A1 | 7/2018 |
| EP | 3598393 A1 | 1/2020 |

OTHER PUBLICATIONS

International Search Report and Written Opinion—PCT/US2023/025892—ISA/EPO—dated Oct. 16, 2023.

* cited by examiner

*Primary Examiner* — Nurun Flora
(74) *Attorney, Agent, or Firm* — QUALCOMM Incorporated

(57) ABSTRACT

Aspects presented herein relate to methods and devices for graphics processing including an apparatus, e.g., a GPU or a CPU. The apparatus may obtain visibility information for a set of primitives in at least one frame associated with the graphics processing, where the at least one frame includes a plurality of bins, such that at least one bin of the plurality of bins includes at least one primitive of the set of primitives. The apparatus may also configure a density map based on the visibility information for the set of primitives, where the density map includes density data associated with an amount of the set of primitives in each of the plurality of bins. Further, the apparatus may map the density data for each of the plurality of bins to a shading rate for each of the plurality of bins.

30 Claims, 10 Drawing Sheets

| Density map 710 | | | | | | | | Bins 740 |
|---|---|---|---|---|---|---|---|---|
| Primitive ratio 711 (e.g., 0.01) | Primitive ratio 712 (e.g., 0.01) | Primitive ratio 713 (e.g., 0.05) | Primitive ratio 714 (e.g., 0.05) | Primitive ratio 715 (e.g., 0.05) | Primitive ratio 716 (e.g., 0.05) | Primitive ratio 717 (e.g., 0.01) | Primitive ratio 718 (e.g., 0.01) | |
| Primitive ratio 721 (e.g., 0.01) | Primitive ratio 722 (e.g., 0.02) | Primitive ratio 723 (e.g., 0.12) | Primitive ratio 724 (e.g., 0.15) | Primitive ratio 725 (e.g., 0.15) | Primitive ratio 726 (e.g., 0.10) | Primitive ratio 727 (e.g., 0.02) | Primitive ratio 728 (e.g., 0.01) | |
| Primitive ratio 731 (e.g., 0.01) | Primitive ratio 732 (e.g., 0.01) | Primitive ratio 733 (e.g., 0.02) | Primitive ratio 734 (e.g., 0.05) | Primitive ratio 735 (e.g., 0.05) | Primitive ratio 736 (e.g., 0.02) | Primitive ratio 737 (e.g., 0.01) | Primitive ratio 738 (e.g., 0.01) | |

FIG. 7

DENSITY DRIVEN VARIABLE RATE SHADING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform graphics processing. The apparatus may obtain an indication of a set of primitives in at least one frame from at least one component in a graphics processing unit (GPU) pipeline, where the indication is obtained before visibility information for the set of primitives is obtained. The apparatus may also obtain visibility information for a set of primitives in at least one frame associated with the graphics processing, where the at least one frame includes a plurality of bins, such that at least one bin of the plurality of bins includes at least one primitive of the set of primitives. Further, the apparatus may configure a density map based on the visibility information for the set of primitives, where the density map includes density data associated with an amount of the set of primitives in each of the plurality of bins. The apparatus may also calculate a ratio or a percentage of the set of primitives in each of the plurality of bins based on the amount of the set of primitives in each of the plurality of bins. Moreover, the apparatus may map the density data for each of the plurality of bins to a shading rate for each of the plurality of bins. The apparatus may also transmit an indication of the shading rate for each of the plurality of bins, where the indication is transmitted after the density data for each of the plurality of bins is mapped to the shading rate for each of the plurality of bins.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is a diagram illustrating an example density map for graphics processing.

DETAILED DESCRIPTION

Figure 1:
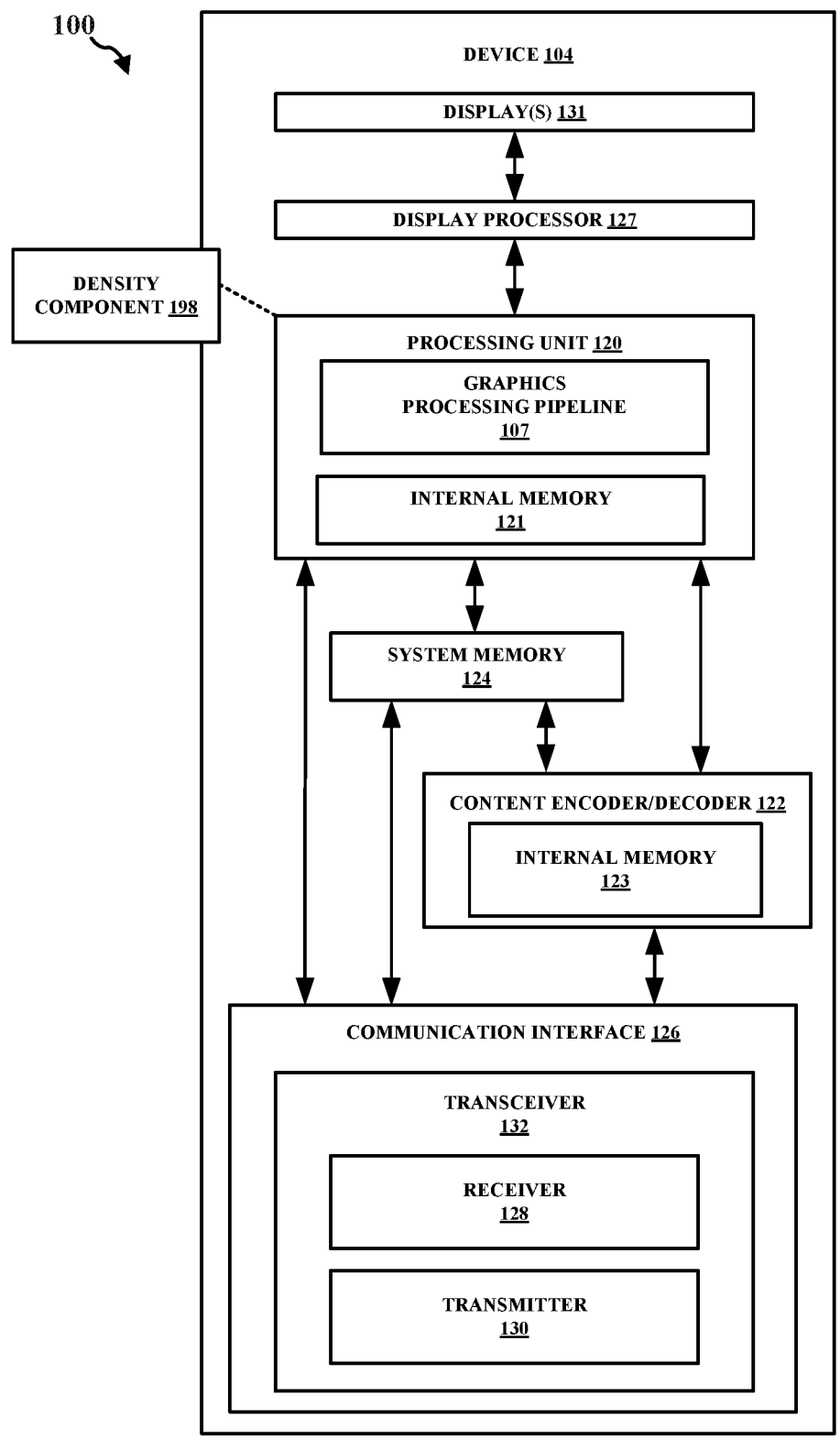
FIG. 1 is a block diagram that illustrates an example content generation system.

Variable rate shading (VRS) may be applied using several different methods, including setting different shading rates via a predefined buffer of quality levels that map to tiles within a framebuffer, which may be referred to as image VRS (i.e., each tile in the framebuffer may have its own shading rate). One problem in applying any VRS without explicit dictation from an application is the manner in which to automatically select quality levels that maximize the amount of work saved while minimizing the amount of perceivable image degradation in a final result. In theory, such quality decay may be most noticeable in regions of the screen upon which the end user is focusing (e.g., a character model or game objective). These screen regions may be characterized by high geometric complexity, such as including a high amount of visible primitives, sharp edges, and/or sudden transitions in color or depth. Since users are likely focusing on these regions with high geometric complexity, dropping the shading rate is more likely to produce noticeable quality loss when compared to areas with less geometric complexity. Some approaches that attempt to estimate such regions using historical data to generate quality levels (i.e., approaches that conclude where interesting regions for the current frame are located based on the location in previous frames) may be inherently reactive and may sacrifice quality/performance benefits if geometric complexity changes from frame-to-frame. In some aspects, regions with high and low geometry complexity may be identified in a visibility pass. Further, there are methods to dynamically update the VRS state prior to rendering the same workloads. Aspects of the present disclosure may apply different shading rates to different areas of a frame or framebuffer based on the impact on visual fidelity. For instance, aspects of the present disclosure may apply one shading rate (e.g., a more conservative or increased shading rate) to regions of the framebuffer that have a high impact on visual fidelity, and apply another shading rate (e.g., a more aggressive or decreased shading rate) to areas with less detail. Additionally, in some instances, aspects of the present disclosure may automatically apply these different shading rates to different areas of the frame. Aspects presented herein may also configure a density map based on visibility information for primitives, which may include density data associated with an amount of the primitives in each of the bins/areas. Further, aspects presented herein may map the density data for multiple bins/areas in a frame to different shading rates for the bins/areas. By doing so, aspects presented herein may optimize the shading rates used on different portions of a frame or scene in graphics processing. In turn, this may help to optimize the power and/or performance utilized for shading the frame or scene at a GPU.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/ or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a density component 198 configured to obtain an indication of a set of primitives in at least one frame from at least one component in a graphics processing unit (GPU) pipeline, where the indication is obtained before visibility information for the set of primitives is obtained. The density component 198 may also be configured to obtain visibility information for a set of primitives in at least one frame associated with the graphics processing, where the at least one frame includes a plurality of bins, such that at least one bin of the plurality of bins includes at least one primitive of the set of primitives. The density component 198 may also be configured to configure a density map based on the visibility information for the set of primitives, where the density map includes density data associated with an amount of the set of primitives in each of the plurality of bins. The density component 198 may also be configured to calculate a ratio or a percentage of the set of primitives in each of the plurality of bins based on the amount of the set of primitives in each of the plurality of bins. The density component 198 may also be configured to map the density data for each of the plurality of bins to a shading rate for each of the plurality of bins. The density component 198 may also be configured to transmit an indication of the shading rate for each of the plurality of bins, where the indication is transmitted after the density data for each of the plurality of bins is mapped to the shading rate for each of the plurality of bins. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
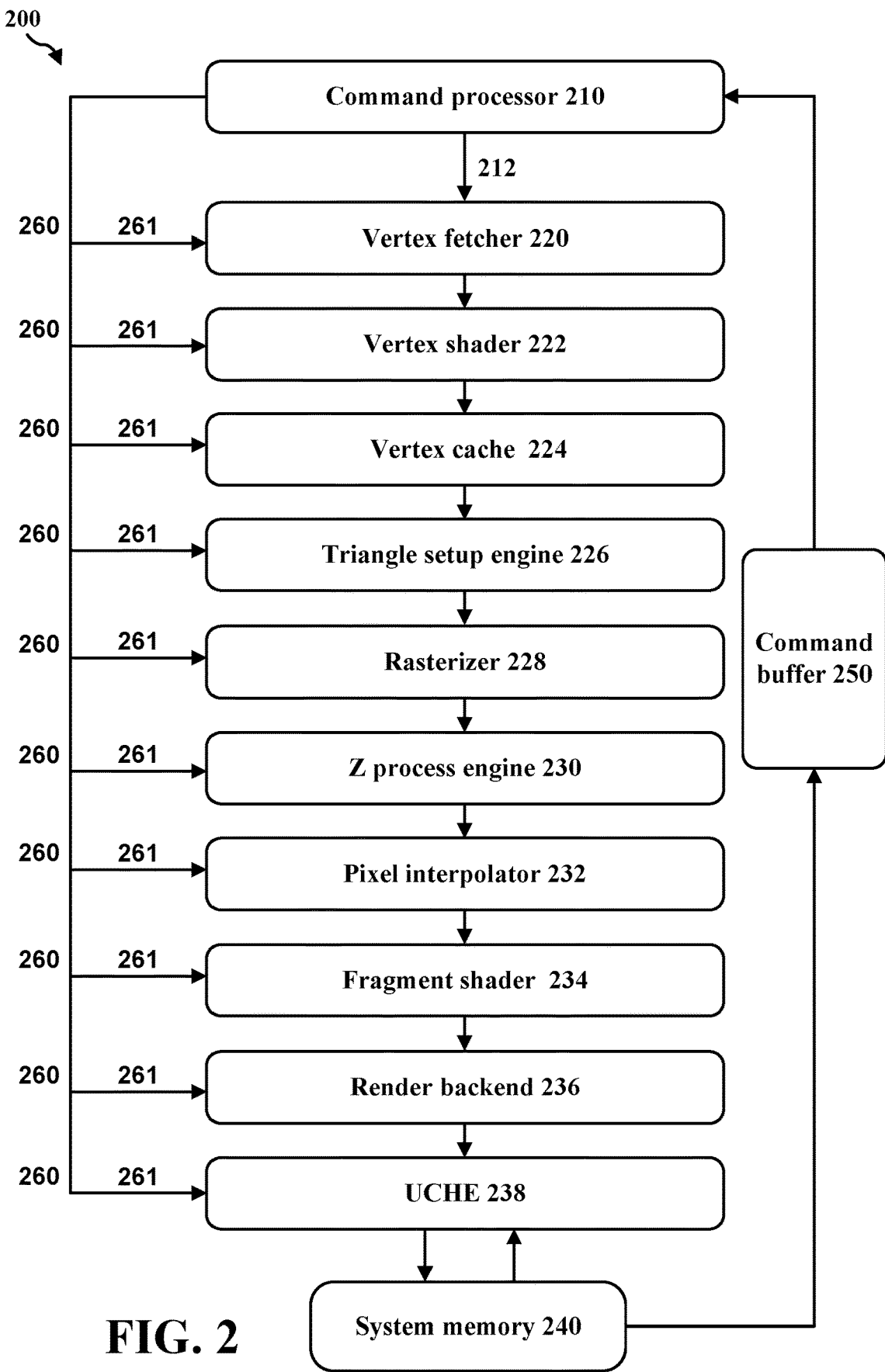
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

In some aspects, GPUs may apply the drawing or rendering process to different bins or tiles. For instance, a GPU may render to one bin, and perform all of the draws for the primitives or pixels in the bin. During the process of rendering to a bin, the render targets may be located in the GMEM. In some instances, after rendering to one bin, the content of the render targets may be moved to a system memory and the GMEM may be freed for rendering the next bin. Additionally, a GPU may render to another bin, and perform the draws for the primitives or pixels in that bin. Therefore, in some aspects, there might be a small number of bins, e.g., four bins, that cover all of the draws in one surface. Further, GPUs may cycle through all of the draws in one bin, but perform the draws for the draw calls that are visible, i.e., draw calls that include visible geometry. In some aspects, a visibility stream may be generated, e.g., in a binning pass, to determine the visibility information of each primitive in an image or scene. For instance, this visibility stream may identify whether a certain primitive is visible or not. In some aspects, this information may be used to remove primitives that are not visible, e.g., in the rendering pass. Also, at least some of the primitives that are identified as visible may be rendered in the rendering pass.

In some aspects of tiled rendering, there may be multiple processing phases or passes. For instance, the rendering may be performed in two passes, e.g., a visibility or bin-visibility pass and a rendering or bin-rendering pass. During a visibility pass, a GPU may input a rendering workload, record the positions of the primitives or triangles, and then determine which primitives or triangles fall into which bin or area. In some aspects of a visibility pass, GPUs may also identify or mark the visibility of each primitive or triangle in a visibility stream. During a rendering pass, a GPU may input the visibility stream and process one bin or area at a time. In some aspects, the visibility stream may be analyzed to determine which primitives, or vertices of primitives, are visible or not visible. As such, the primitives, or vertices of primitives, that are visible may be processed. By doing so, GPUs may reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information may be used to determine or generate a visibility stream. In a rendering pass, the primitives in each bin may be rendered separately. In these instances, the visibility stream may be fetched from memory used to drop primitives which are not visible for that bin.

Some aspects of GPUs or GPU architectures may provide a number of different options for rendering, e.g., software rendering and hardware rendering. In software rendering, a driver or CPU may replicate an entire frame geometry by processing each view one time. Additionally, some different states may be changed depending on the view. As such, in software rendering, the software may replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware may manage the replication or processing of the primitives or triangles for each viewpoint in an image.

Figure 3:
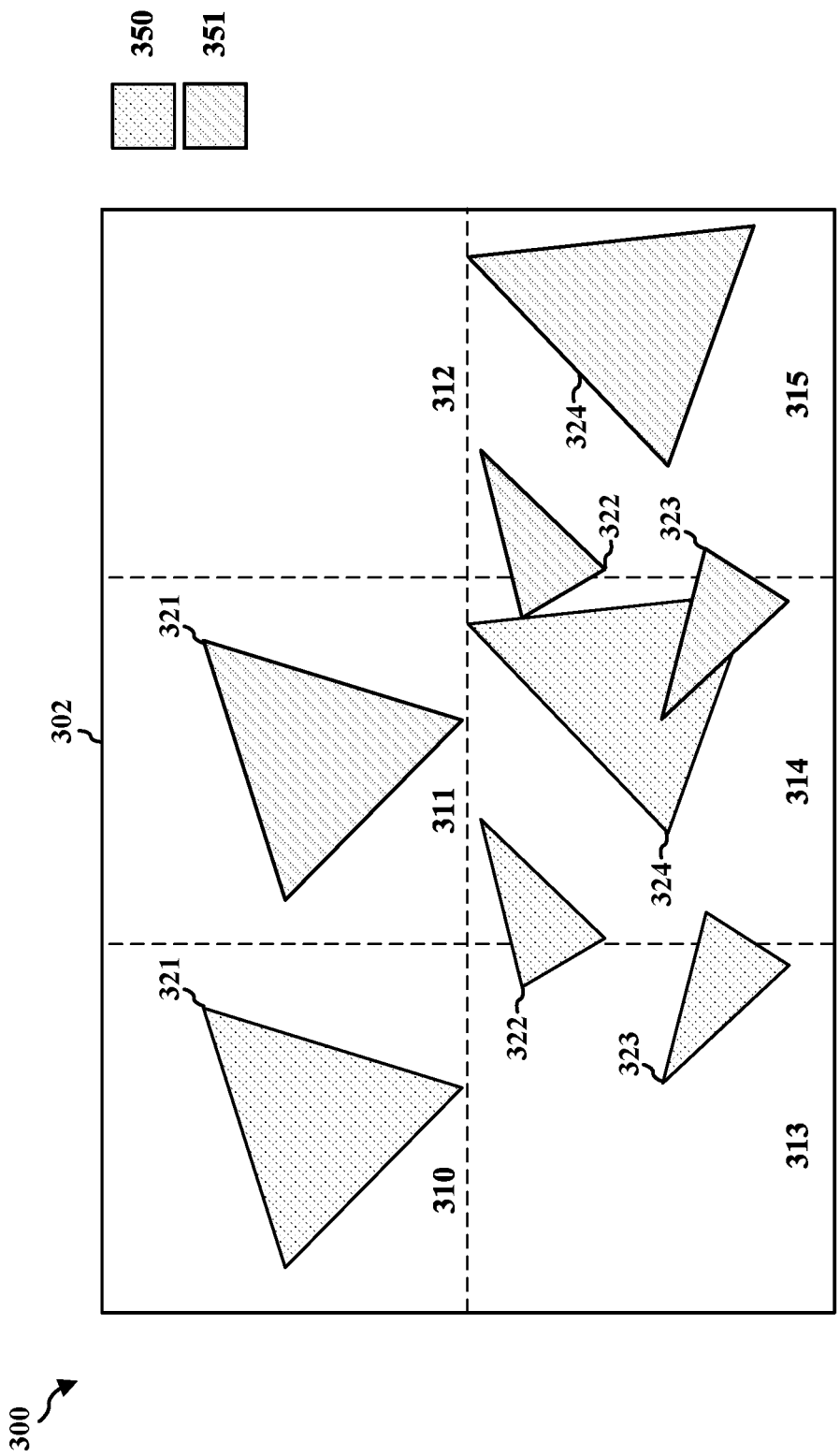
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 may utilize multiple viewpoints or multi-view rendering.

As indicated herein, GPUs or graphics processor units may use a tiled rendering architecture to reduce power consumption or save memory bandwidth. As further stated above, this rendering method may divide the scene into multiple bins, as well as include a visibility pass that identifies the triangles that are visible in each bin. Thus, in tiled rendering, a full screen may be divided into multiple bins or tiles. The scene may then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer may be a portion of memory or random access memory (RAM), e.g., containing a bitmap or storage, to help store display data for a GPU. The frame buffer may also be a memory buffer containing a complete frame of data. Additionally, the frame buffer may be a logic buffer. In some aspects, updating the frame buffer may be performed in bin or tile rendering, where, as discussed above, a surface is divided into multiple bins or tiles and then each bin or tile may be separately rendered. Further, in tiled rendering, the frame buffer may be partitioned into multiple bins or tiles.

Some aspects of graphics processing may utilize different types of shading, e.g., variable rate shading (VRS). Variable rate shading is a manner in which to allocate rendering performance or power at varying rates. For example, variable rate shading may be utilized by a graphics processing unit (GPU) to allocate rendering performance/power at varying rates across a rendered image. That is, variable rate shading is a feature that increases rendering performance and quality by varying the shading rate for different regions of an image or frame. In addition, variable rate shading may be referred to as coarse pixel shading.

In some instances, variable rate shading may significantly increase the performance of certain applications by reducing the amount of work performed or executed at a graphics processing unit (GPU). For example, variable rate shading may reduce the number of times that a fragment shader executes instructions at a GPU. Variable rate shading may also result in a reduced shading rate with a small amount of perceptible visual disparity. For instance, variable rate shading may result in a reduced shading rate with little or no reduction in perceptible visual quality at the output image.

Figure 4:
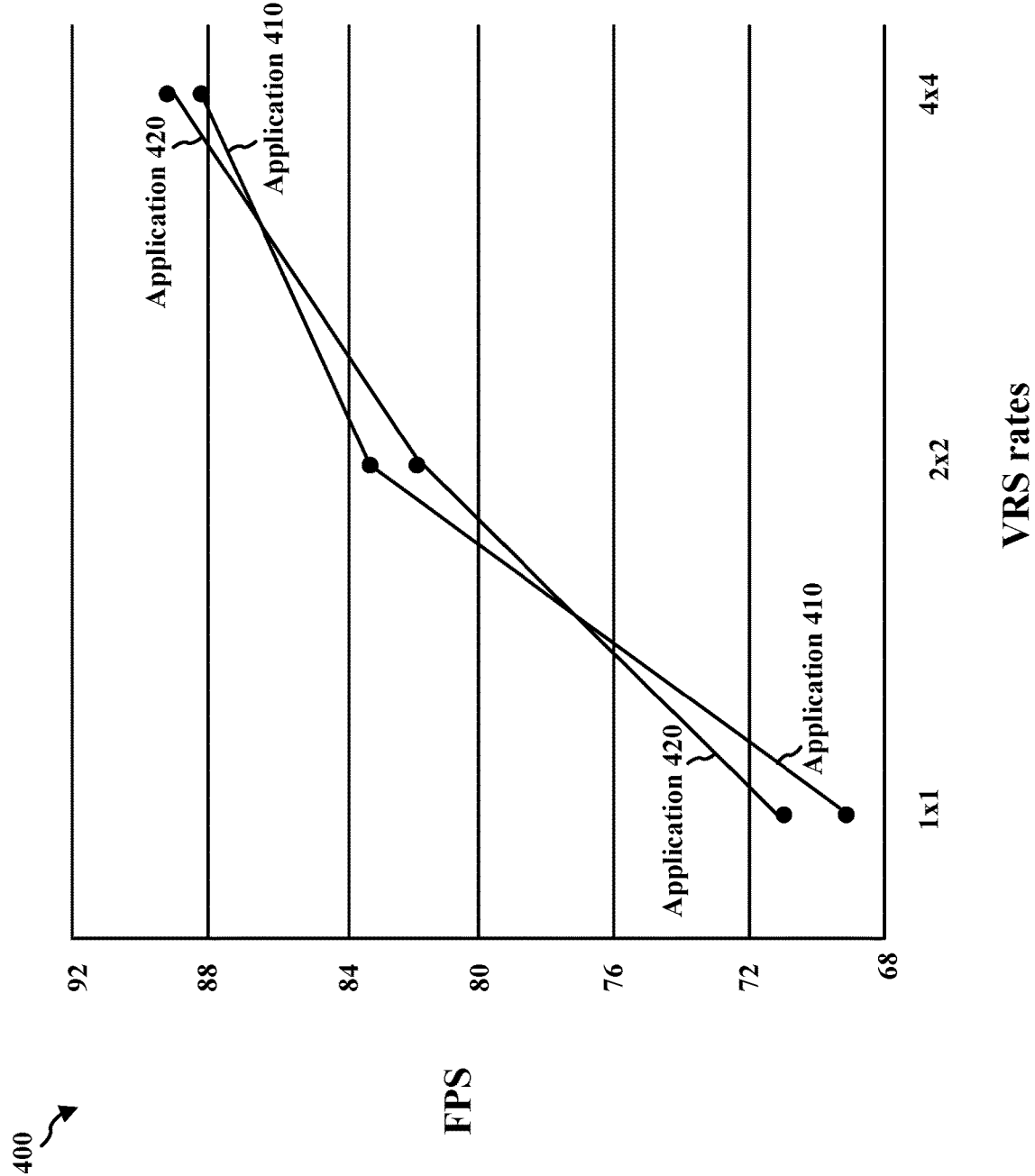
FIG. 4 is a graph illustrating an example of a GPU rendering performance.

FIG. 4 illustrates a graph 400 of one example of a GPU rendering performance utilizing VRS rates. More specifically, graph 400 in FIG. 4 displays a rendering performance with an amount of frames per second (fps) utilizing VRS rates with forced draw states. As shown in FIG. 4, the amount of fps for different applications (e.g., application 410 and application 420) may increase with an increasing amount of forced draw state VRS rates. For example, for 1×1 variable rate shading, the fps may be 69 and 71 for application 410 and application 420, respectively. For 2×2 variable rate shading, the fps may be 83 and 82 for application 410 and application 420, respectively. For 4×4 variable rate shading, the fps may be 88 and 89 for application 410 and application 420, respectively. As depicted in FIG. 4, variable rate shading may significantly increase the performance of certain applications by reducing the amount of work performed or executed at a GPU.

One problem in applying any VRS without explicit dictation from an application is the manner in which to automatically select quality levels that maximize the amount of work saved while minimizing the amount of perceivable image degradation in a final result. In theory, such quality decay may be most noticeable in regions of the screen upon which the end user is focusing (e.g., a character model or game objective). These screen regions may be characterized by high geometric complexity, such as including a high amount of visible primitives, sharp edges, and/or sudden transitions in color or depth. Since users are likely focusing on these regions with high geometric complexity, dropping the shading rate is more likely to produce noticeable quality loss when compared to areas with less geometric complexity.

Some approaches that attempt to estimate such regions using historical data to generate quality levels (i.e., approaches that conclude where interesting regions for the current frame are located based on the location in previous frames) may be inherently reactive and may sacrifice quality/performance benefits if geometric complexity changes from frame-to-frame. In some aspects, regions with high and low geometry complexity may be identified in a visibility pass. Further, there are methods to dynamically update the VRS state prior to rendering the same workloads. Based on the above, it may be beneficial to apply different shading rates to different areas of a frame or framebuffer based on the impact on visual fidelity. That is, it may be beneficial to apply one shading rate (e.g., a more conservative or increased shading rate) to regions of the framebuffer that have a high impact on visual fidelity, and apply another shading rate (e.g., a more aggressive or decreased shading rate) to areas with less detail. Moreover, it may be beneficial to automatically apply these different shading rates to different areas of the frame.

Aspects of the present disclosure may apply different shading rates to different areas of a frame or framebuffer based on the impact on visual fidelity. For instance, aspects of the present disclosure may apply one shading rate (e.g., a more conservative or increased shading rate) to regions of the framebuffer that have a high impact on visual fidelity, and apply another shading rate (e.g., a more aggressive or decreased shading rate) to areas with less detail. Additionally, in some instances, aspects of the present disclosure may automatically apply these different shading rates to different areas of the frame. Aspects presented herein may also configure a density map based on visibility information for primitives, which may include density data associated with an amount of the primitives in each of the bins/areas. Further, aspects presented herein may map the density data for multiple bins/areas in a frame to different shading rates for the bins/areas. By doing so, aspects presented herein may optimize the shading rates used on different portions of a frame or scene in graphics processing. In turn, this may help to optimize the tradeoff between visual fidelity and the power and/or performance utilized for shading the frame or scene at a GPU.

In some instances, aspects of the present disclosure may utilize different types of VRS (e.g., image VRS) to achieve certain VRS approaches (e.g., a geometry-density based VRS approach or an auto-VRS approach). Also, geometry data (e.g., raw geometry data) may be generated with no additional overhead on GPUs (e.g., GPUs that typically run a bin visibility pass prior to a rendering pass for a given workload). Aspects presented herein may also utilize a software flow for a binning pass and/or a rendering pass. For instance, a binning pass may receive visibility data on a per-bin basis and then generate a density map, where values in the density map may be mapped to different shading rates. During the rendering pass, the shading rates may be transmitted to a GPU, and the GPU may then apply the shading rates when rendering data associated with bins.

Figure 5:
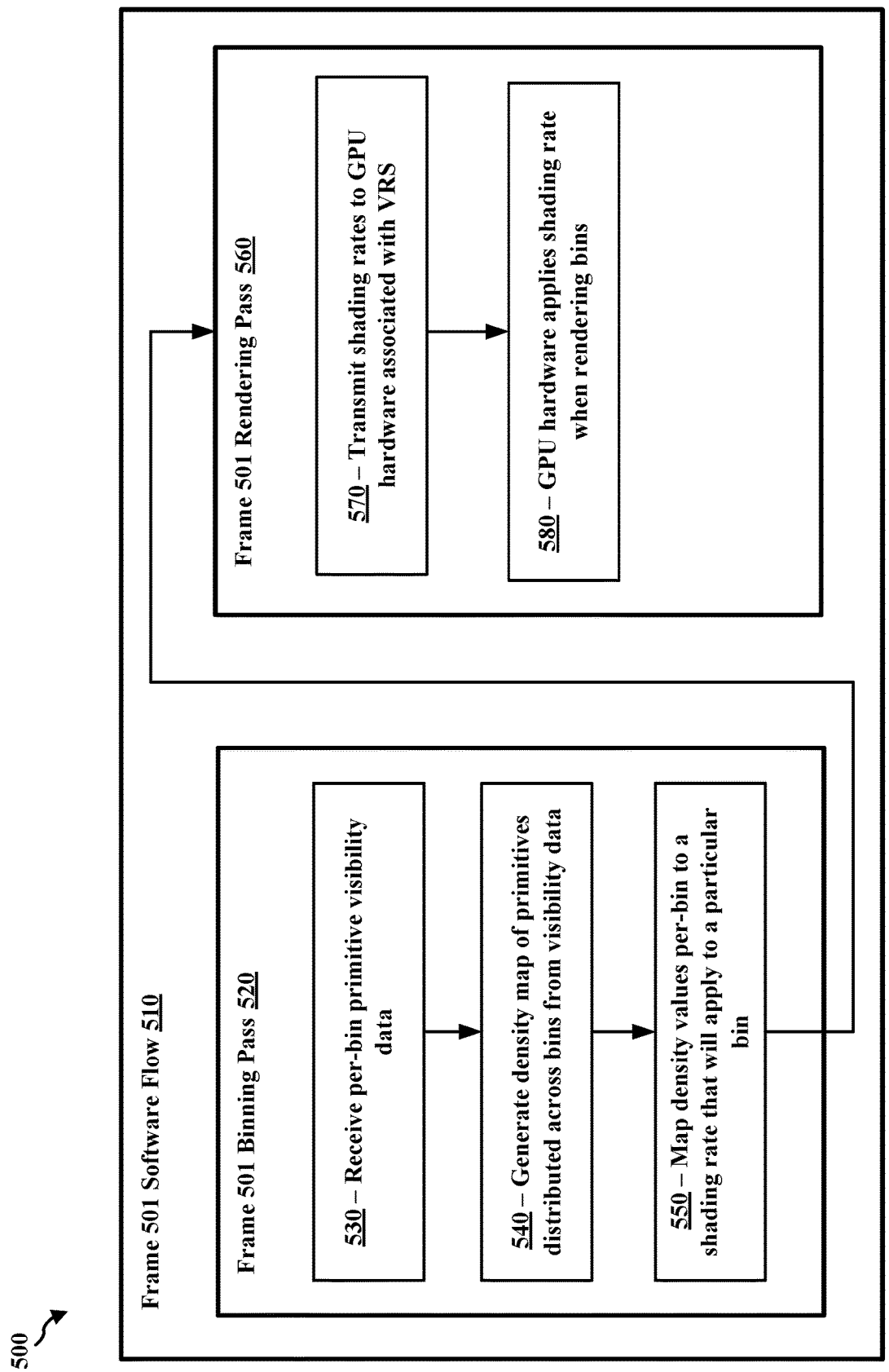
FIG. 5 is a diagram illustrating an example software flow for graphics processing.

FIG. 5 is a diagram 500 illustrating an example software flow for graphics processing. More specifically, diagram 500 depicts a software flow 510 for a frame 501 (e.g., a frame "N" within a plurality of frames in a scene associated with graphics processing). As shown in FIG. 5, diagram 500 includes software flow 510, binning pass 520 (e.g., binning pass for frame 501) including step 530, step 540, and step 550, as well as rendering pass 560 (e.g., rendering pass for frame 501) including step 570 and step 580. At step 530 in binning pass 520, software flow 510 may configure a GPU to receive per-bin primitive visibility data. At step 540 in binning pass 520, software flow 510 may configure a GPU to generate a density map of primitives that are distributed across bins from the visibility data. At step 550 in binning pass 520, software flow 510 may configure a GPU to map density values (e.g., per-bin density values) to a shading rate that will apply to a particular bin. At step 570 in rendering pass 560, software flow 510 may configure a GPU to transmit shading rates to GPU hardware associated with VRS. At step 580 in rendering pass 560, software flow 510 may configure a GPU (e.g., GPU hardware) to apply a shading rate when rendering the bins.

In some aspects, a GPU (e.g., GPU hardware) may generate a per-bin metric of visible primitives within a bin from a visibility pass. The GPU or GPU hardware may also compute the amount of primitives (e.g., a ratio of primitives) for an entire framebuffer that exists within a bin. In some instances, software may configure the GPU or GPU hardware to compute the amount of primitives (e.g., a ratio of primitives). This primitive ratio may provide an indication of the complexity of a bin in terms of its geometry (e.g., the amount of primitives that are within a bin). That is, a high primitive ratio may indicate that a particular bin is complex (i.e., a significant portion of the primitives in a scene are packed into the particular bin). Likewise, a low primitive ratio may indicate that a particular bin is not complex (i.e., a low portion of the primitives in the scene are packed into the particular bin). The aggregation of all primitive ratios may constitute a density map, which may be configured or generated by the GPU. For example, the density map may be configured or generated based on visibility information for the primitives in a scene or frame. The density map may include density data associated with an amount of primitives in each of the bins in a scene or frame. Also, the density map may plot which bins are geometrically dense or geometry-heavy (i.e., the bin includes a high amount of primitives compared to other bins) and/or which bins are geometrically sparse or geometry-light (i.e., the bin includes a small amount of primitives compared to other bins).

Figure 6:
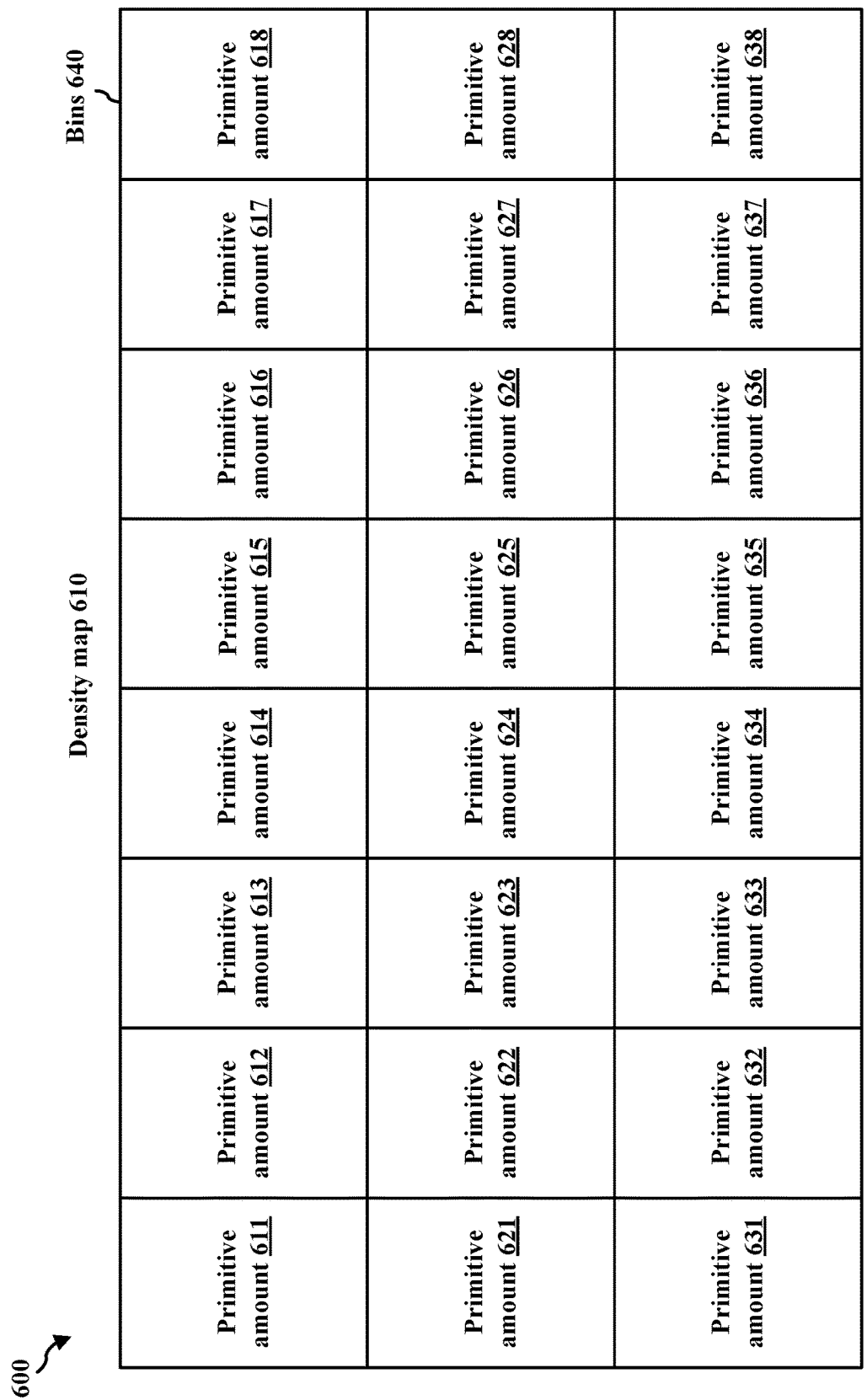
FIG. 6 is a diagram illustrating an example density map for graphics processing.

FIG. 6 is a diagram 600 illustrating an example density map for graphics processing. More specifically, diagram 600 depicts a density map 610 including a number of primitives per bin. As shown in FIG. 6, density map 610 includes a number of bins 640 that each include an amount of primitives. For example, there may be 24 bins (e.g., bins 640) associated with density map 610 and each of the bins 640 may include a corresponding primitive amount (e.g., primitive amount 611, primitive amount 612, primitive amount 613, primitive amount 614, primitive amount 615, primitive amount 616, primitive amount 617, primitive amount 618, primitive amount 621, primitive amount 622, primitive amount 623, primitive amount 624, primitive amount 625, primitive amount 626, primitive amount 627, primitive amount 628, primitive amount 631, primitive amount 632, primitive amount 633, primitive amount 634, primitive amount 635, primitive amount 636, primitive amount 637, and primitive amount 638). Although FIG. 6 shows there are 24 bins in density map 610, the density map 610 may include any appropriate number of bins 640 (e.g., 4, 8, 12, 16, 20, 27, 32, etc.). FIG. 6 depicts that the density map 610 may provide an indication of the complexity of each of the bins in terms of its geometry (e.g., the amount of primitives that are within a bin). For example, each of the bins 640 includes a primitive amount, which corresponds to the amount of primitives in the particular bin compared to the total amount of primitives within the entire scene or frame depicted by density map 610. A high primitive amount (or ratio/percentage) may indicate that a particular bin is complex (i.e., a significant portion of the primitives in a scene or frame are packed into the particular bin). Also, a low primitive amount (or ratio/percentage) may indicate that a particular bin is not complex (i.e., a low portion of the primitives in the scene or frame are packed into the particular bin). The density map 610 may include the aggregation of all primitive amounts or ratios within a particular scene or frame. Additionally, the amount of primitives may be expressed as a ratio or percentage, as indicated in FIG. 7.

FIG. 7 is a diagram 700 illustrating an example density map for graphics processing. More specifically, diagram 700 depicts a density map 710 including a number of primitives per bin. As shown in FIG. 7, density map 710 includes a number of bins 740 that each include a ratio or percentage of all of the primitives within a scene. For example, there are 24 bins (e.g., bins 740) associated with density map 710 and each of the bins 740 include a corresponding primitive ratio (e.g., primitive ratio 711, primitive ratio 712, primitive ratio 713, primitive ratio 714, primitive ratio 715, primitive ratio 716, primitive ratio 717, primitive ratio 718, primitive ratio 721, primitive ratio 722, primitive ratio 723, primitive ratio 724, primitive ratio 725, primitive ratio 726, primitive ratio 727, primitive ratio 728, primitive ratio 731, primitive ratio 732, primitive ratio 733, primitive ratio 734, primitive ratio 735, primitive ratio 736, primitive ratio 737, and primitive ratio 738). While FIG. 7 shows there are 24 bins in density map 710, the density map 710 may include any appropriate number of bins 740 (e.g., 4, 8, 12, 16, 20, 27, 32, etc.). FIG. 7 depicts that the density map 710 may provide an indication of the complexity of each of the bins in terms of its geometry (e.g., the ratio of primitives that are within a bin). For example, each of the bins 740 includes a primitive ratio (or percentage), which corresponds to the ratio of primitives in the particular bin compared to the total amount of primitives within the entire scene or frame depicted in density map 710. A high primitive ratio (or percentage) may indicate that a particular bin is complex (i.e., a significant portion of the primitives in a scene or frame are packed into the particular bin). Further, a low primitive ratio (or percentage) may indicate that a particular bin is not complex (i.e., a low portion of the primitives in the scene or frame are packed into the particular bin). The density map 710 may include the aggregation of all primitive amounts (e.g., ratios or percentages) within a particular scene or frame. As shown in FIG. 7, the amount of primitives that are included within each of the bins 740 in density map 710 may be expressed as a ratio or percentage.

FIGS. 6 and 7 depict examples of density maps utilized by aspects of the present disclosure, and more particularly, how a density map is configured by a GPU. In some instances, software may configure the GPU to generate the density map. Each outlined block in FIGS. 6 and 7 corresponds to a bin (e.g., a particular bin in bins 640 and bins 740). In FIG. 6, each amount (e.g., primitive amounts 611-638) in each particular bin (e.g., bins 640) denotes the amount of primitives in the entire workload (e.g., a graphics workload) that are present in that particular bin. Also, in FIG. 7, each ratio (e.g., primitive ratios 711-738) in each particular bin (e.g., bins 740) denotes the ratio or percentage of primitives in the entire workload (e.g., a graphics workload) that are present in that particular bin. In both FIG. 6 and FIG. 7, the bins 640 and bins 740 that contain the subject of the scene (e.g., the most noticeable or conspicuous portion of the scene) may be the densest bins. For example, the subject of the scene in FIG. 7 may correspond to the center bins including primitive ratio 724 and primitive ratio 725, each of which include the highest primitive ratios in bins 740 (e.g., a ratio of 0.15).

In some instances, aspects presented herein may store the data corresponding to the density map (e.g., density data). This data (e.g., density data) may be associated with an amount of primitives in each of the bins in the density map. Additionally, the density data for each of the bins may be mapped (i.e., converted or translated) to a shading rate for each of the bins. For instance, once the density data is stored (e.g., stored in a GPU-accessible buffer), various operations (e.g., memory manipulation operations) may be triggered to update the buffer (e.g., image VRS quality buffer) and adjust the shading rate for each bin. In some aspects, the shading rate may be dynamically updated for each bin based on the corresponding density data in the density map.

Some aspects of the present disclosure may utilize certain algorithms for updating VRS procedures (e.g., image VRS update algorithms). These algorithms (e.g., VRS update algorithms) may be utilized with either binned rendering or direct rendering at GPUs. In some instances, a bin visibility pass may be run first in either binned rendering or direct rendering, but it may be discarded once visible primitive data is saved (e.g., if direct rendering is utilized). Also, for each primitive amount/ratio in a density map, aspects presented herein may: (1) read the visible primitive ratio from memory and/or (2) use the ratio to lookup into a preprogrammed table that maps ratios to VRS shading rates. For example, a primitive ratio of 0.04 (i.e., less than 4% of all primitives in the scene are in this bin) may be mapped to a certain shading rate (e.g., a 2×2 shading rate, etc.). This table may be adjusted or tuned (e.g., tuned offline) for the throughput capabilities of a target GPU. Additionally, aspects presented herein may write the retrieved VRS shading rate for the bin to every slot in a buffer (e.g., a hardware image VRS quality buffer) that corresponds to the particular bin (e.g., many slots may correspond to one bin). After this, the GPU may continue to normal rendering (binned rendering or other rendering). Moreover, VRS hardware at the GPU may automatically apply the quality levels programmed in the buffer (e.g., an image VRS quality buffer).

Aspects of the present disclosure may include a number of benefits or advantages. For instance, aspects presented herein may apply different shading rates to different areas of a frame or framebuffer based on the impact on visual fidelity. For example, aspects of the present disclosure may apply one shading rate (e.g., a more conservative or increased shading rate) to regions of the framebuffer that have a high impact on visual fidelity, and apply another shading rate (e.g., a more aggressive or decreased shading rate) to areas with less detail. Aspects presented herein may also configure a density map based on visibility information for primitives, which may include density data associated with an amount of the primitives in each of the bins/areas. Further, aspects presented herein may map the density data for multiple bins/areas in a frame to different shading rates for the bins/areas. By doing so, aspects presented herein may optimize the shading rates used for different portions of a frame or scene in graphics processing. In turn, this may help to optimize the power and/or performance utilized for shading the frame or scene at a GPU.

Figure 8:
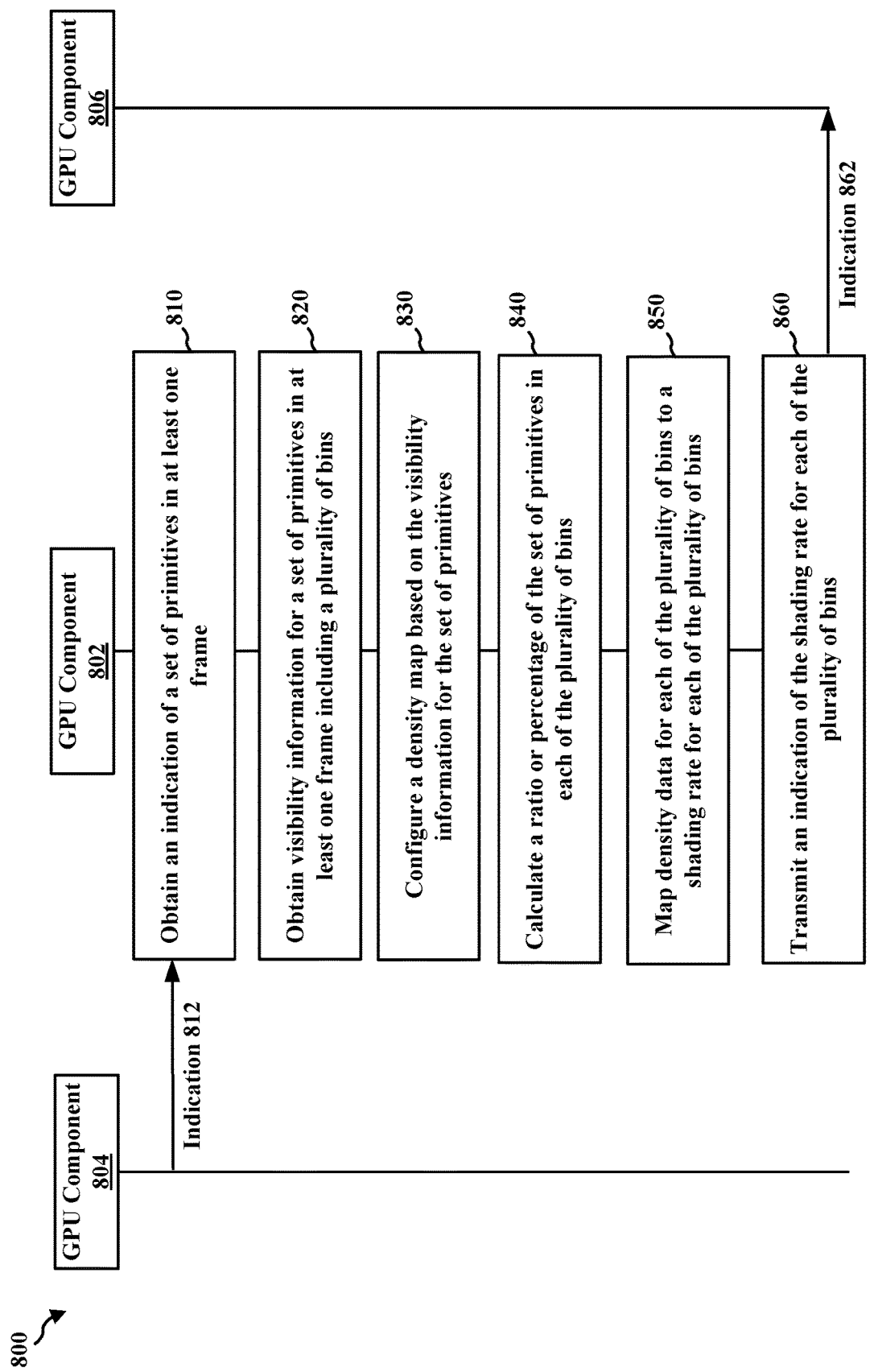
FIG. 8 is a communication flow diagram illustrating example communications between GPU components.

FIG. 8 is a communication flow diagram 800 of graphics processing in accordance with one or more techniques of this disclosure. As shown in FIG. 8, diagram 800 includes example communications between GPU component 802 (e.g., a component in a GPU or GPU pipeline, software for controlling a GPU, or a processor for controlling a GPU), GPU component 804 (e.g., a component in a GPU or GPU pipeline, or other graphics processor), and GPU component 806 (e.g., a component in a GPU or GPU pipeline, or other graphics processor), in accordance with one or more techniques of this disclosure.

At 810, GPU component 802 may obtain an indication of a set of primitives in at least one frame from at least one component in a graphics processing unit (GPU) pipeline (e.g., obtain indication 812 from GPU component 804), where the indication is obtained before visibility information for the set of primitives is obtained.

At 820, GPU component 802 may obtain visibility information for a set of primitives in at least one frame associated with the graphics processing, where the at least one frame includes a plurality of bins, such that at least one bin of the plurality of bins includes at least one primitive of the set of primitives. The visibility information for the set of primitives may be associated with a binning pass for the at least one frame. The at least one frame may correspond to at least one graphics workload for the graphics processing.

At 830, GPU component 802 may configure a density map based on the visibility information for the set of primitives, where the density map includes density data associated with an amount of the set of primitives in each of the plurality of bins. The density data associated with the amount of the set of primitives in each of the plurality of bins may correspond to a density of a first amount of visible primitives of the set of primitives in each of the plurality of bins. In some aspects, configuring the density map based on the visibility information may comprise: generating the density map based on the visibility information. As such, GPU component 802 may generate the density map based on the visibility information At 840, GPU component 802 may calculate a ratio or a percentage of the set of primitives in each of the plurality of bins based on the amount of the set of primitives in each of the plurality of bins. For instance, the amount of the set of primitives in each of the plurality of bins may be associated with a ratio or a percentage of the set of primitives in each of the plurality of bins.

At 850, GPU component 802 may map the density data for each of the plurality of bins to a shading rate for each of the plurality of bins. A first shading rate for at least one first bin of the plurality of bins may be different from a second shading rate for at least one second bin of the plurality of bins. The first shading rate for the at least one first bin may be shaded differently from the second shading rate for the at least one second bin during a rendering pass at a graphics processing unit (GPU). Additionally, the shading rate for each of the plurality of bins may be associated with a quality level for shading a plurality of draws associated with the at least one frame. Further, the shading rate for each of the plurality of bins may be associated with variable rate shading (VRS). In some aspects, mapping the density data for each of the plurality of bins to the shading rate for each of the plurality of bins may comprise: converting the density data for each of the plurality of bins to the shading rate for each of the plurality of bins. As such, GPU component 802 may convert the density data for each of the plurality of bins to the shading rate for each of the plurality of bins.

At 860, GPU component 802 may transmit an indication of the shading rate for each of the plurality of bins (e.g., transmit indication 862 to GPU component 806), where the indication is transmitted after the density data for each of the plurality of bins is mapped to the shading rate for each of the plurality of bins. The indication of the shading rate for each of the plurality of bins may be transmitted to at least one component in a graphics processing unit (GPU) pipeline. Also, the shading rate for each of the plurality of bins may be applied to a rendered image associated with the at least one frame.

Figure 9:
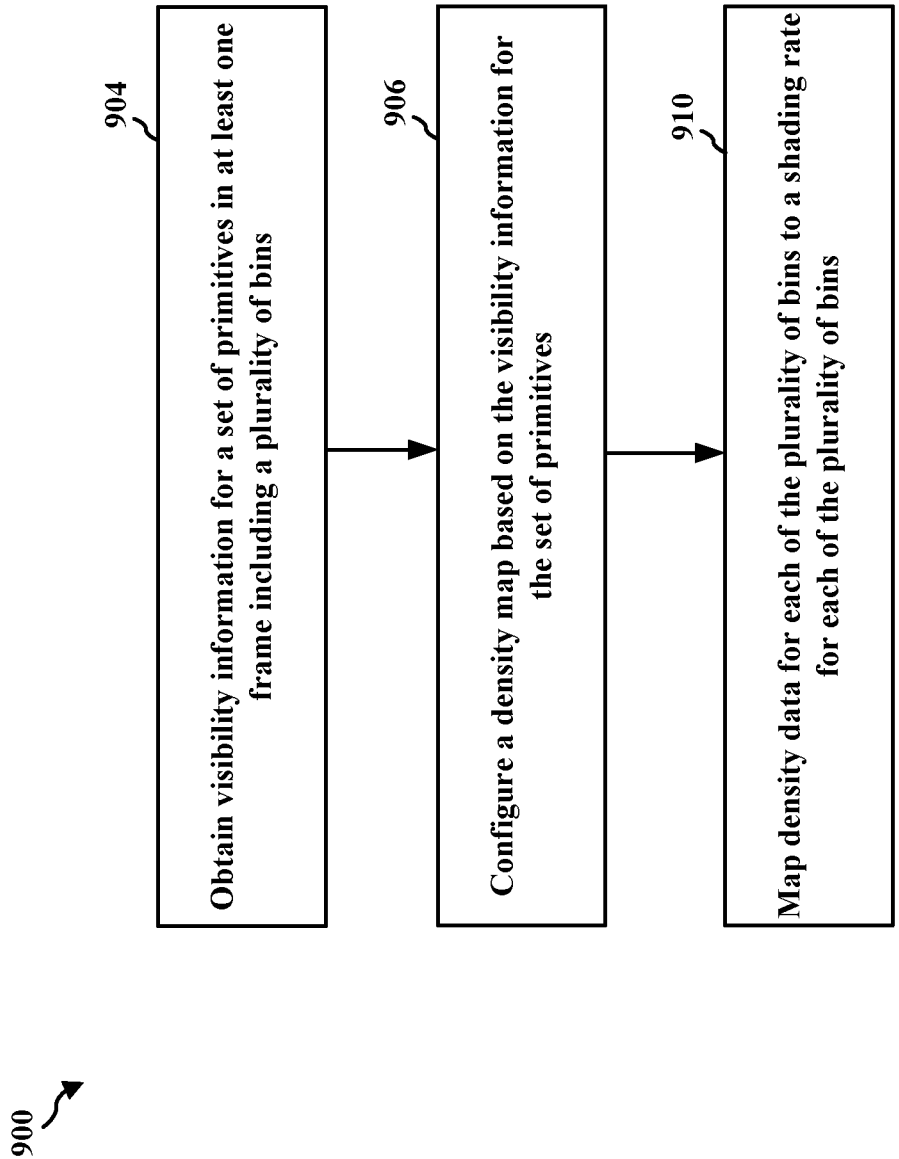
FIG. 9 is a flowchart of an example method of graphics processing.

FIG. 9 is a flowchart 900 of an example method of graphics processing in accordance with one or more techniques of this disclosure. The method may be performed by a GPU, a GPU component (e.g., a component in a GPU or GPU pipeline, software for controlling a GPU, or a processor for controlling a GPU), a graphics processor, a CPU (or other central processor), an apparatus for graphics processing, a wireless communication device, and/or any apparatus that may perform graphics processing as used in connection with the examples of FIGS. 1-8.

At 904, the GPU may obtain visibility information for a set of primitives in at least one frame associated with the graphics processing, where the at least one frame includes a plurality of bins, such that at least one bin of the plurality of bins includes at least one primitive of the set of primitives, as described in connection with the examples in FIGS. 1-8. For example, as described in 820 of FIG. 8, GPU component 802 may obtain visibility information for a set of primitives in at least one frame associated with the graphics processing, where the at least one frame includes a plurality of bins, such that at least one bin of the plurality of bins includes at least one primitive of the set of primitives. Further, step 904 may be performed by processing unit 120 in FIG. 1. The visibility information for the set of primitives may be associated with a binning pass for the at least one frame. The at least one frame may correspond to at least one graphics workload for the graphics processing.

At 906, the GPU may configure a density map based on the visibility information for the set of primitives, where the density map includes density data associated with an amount of the set of primitives in each of the plurality of bins, as described in connection with the examples in FIGS. 1-8. For example, as described in 830 of FIG. 8, GPU component 802 may configure a density map based on the visibility information for the set of primitives, where the density map includes density data associated with an amount of the set of primitives in each of the plurality of bins. Further, step 906 may be performed by processing unit 120 in FIG. 1. The density data associated with the amount of the set of primitives in each of the plurality of bins may correspond to a density of a first amount of visible primitives of the set of primitives in each of the plurality of bins. In some aspects, configuring the density map based on the visibility information may comprise: generating the density map based on the visibility information. As such, GPU component 802 may generate the density map based on the visibility information At 910, the GPU may map the density data for each of the plurality of bins to a shading rate for each of the plurality of bins, as described in connection with the examples in FIGS. 1-8. For example, as described in 850 of FIG. 8, GPU component 802 may map the density data for each of the plurality of bins to a shading rate for each of the plurality of bins. Further, step 910 may be performed by processing unit 120 in FIG. 1. A first shading rate for at least one first bin of the plurality of bins may be different from a second shading rate for at least one second bin of the plurality of bins. The first shading rate for the at least one first bin may be shaded differently from the second shading rate for the at least one second bin during a rendering pass at a graphics processing unit (GPU). Additionally, the shading rate for each of the plurality of bins may be associated with a quality level for shading a plurality of draws associated with the at least one frame. Further, the shading rate for each of the plurality of bins may be associated with variable rate shading (VRS). In some aspects, mapping the density data for each of the plurality of bins to the shading rate for each of the plurality of bins may comprise: converting the density data for each of the plurality of bins to the shading rate for each of the plurality of bins. As such, GPU component 802 may convert the density data for each of the plurality of bins to the shading rate for each of the plurality of bins.

Figure 10:
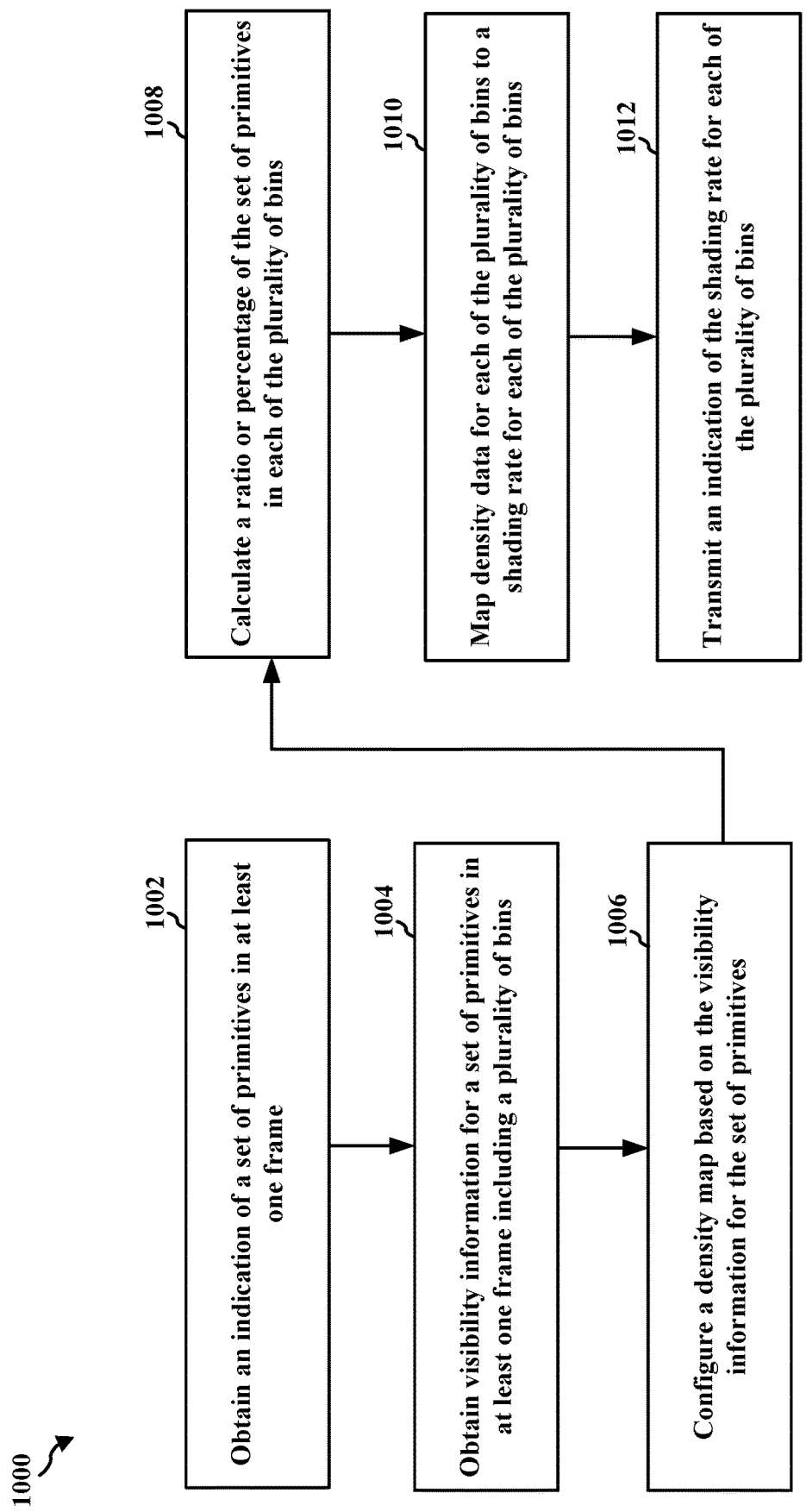
FIG. 10 is a flowchart of an example method of graphics processing.

FIG. 10 is a flowchart 1000 of an example method of graphics processing in accordance with one or more techniques of this disclosure. The method may be performed by a GPU, a GPU component (e.g., a component in a GPU or GPU pipeline, software for controlling a GPU, or a processor for controlling a GPU), a graphics processor, a CPU (or other central processor), an apparatus for graphics processing, a wireless communication device, and/or any apparatus that may perform graphics processing as used in connection with the examples of FIGS. 1-8.

At 1002, the GPU may obtain an indication of a set of primitives in at least one frame from at least one component in a GPU pipeline, where the indication is obtained before visibility information for the set of primitives is obtained, as described in connection with the examples in FIGS. 1-8. For example, as described in 810 of FIG. 8, GPU component 802 may obtain an indication of a set of primitives in at least one frame from at least one component in a GPU pipeline, where the indication is obtained before visibility information for the set of primitives is obtained. Further, step 1002 may be performed by processing unit 120 in FIG. 1.

At 1004, the GPU may obtain visibility information for a set of primitives in at least one frame associated with the graphics processing, where the at least one frame includes a plurality of bins, such that at least one bin of the plurality of bins includes at least one primitive of the set of primitives, as described in connection with the examples in FIGS. 1-8. For example, as described in 820 of FIG. 8, GPU component 802 may obtain visibility information for a set of primitives in at least one frame associated with the graphics processing, where the at least one frame includes a plurality of bins, such that at least one bin of the plurality of bins includes at least one primitive of the set of primitives. Further, step 1004 may be performed by processing unit 120 in FIG. 1. The visibility information for the set of primitives may be associated with a binning pass for the at least one frame. The at least one frame may correspond to at least one graphics workload for the graphics processing.

At 1006, the GPU may configure a density map based on the visibility information for the set of primitives, where the density map includes density data associated with an amount of the set of primitives in each of the plurality of bins, as described in connection with the examples in FIGS. 1-8. For example, as described in 830 of FIG. 8, GPU component 802 may configure a density map based on the visibility information for the set of primitives, where the density map includes density data associated with an amount of the set of primitives in each of the plurality of bins. Further, step 1006 may be performed by processing unit 120 in FIG. 1. The density data associated with the amount of the set of primitives in each of the plurality of bins may correspond to a density of a first amount of visible primitives of the set of primitives in each of the plurality of bins. In some aspects, configuring the density map based on the visibility information may comprise: generating the density map based on the visibility information. As such, GPU component 802 may generate the density map based on the visibility information At 1008, the GPU may calculate a ratio or a percentage of the set of primitives in each of the plurality of bins based on the amount of the set of primitives in each of the plurality of bins, as described in connection with the examples in FIGS. 1-8. For example, as described in 840 of FIG. 8, GPU component 802 may calculate a ratio or a percentage of the set of primitives in each of the plurality of bins based on the amount of the set of primitives in each of the plurality of bins. Further, step 1008 may be performed by processing unit 120 in FIG. 1. For instance, the amount of the set of primitives in each of the plurality of bins may be associated with a ratio or a percentage of the set of primitives in each of the plurality of bins.

At 1010, the GPU may map the density data for each of the plurality of bins to a shading rate for each of the plurality of bins, as described in connection with the examples in FIGS. 1-8. For example, as described in 850 of FIG. 8, GPU component 802 may map the density data for each of the plurality of bins to a shading rate for each of the plurality of bins. Further, step 1010 may be performed by processing unit 120 in FIG. 1. A first shading rate for at least one first bin of the plurality of bins may be different from a second shading rate for at least one second bin of the plurality of bins. The first shading rate for the at least one first bin may be shaded differently from the second shading rate for the at least one second bin during a rendering pass at a graphics processing unit (GPU). Additionally, the shading rate for each of the plurality of bins may be associated with a quality level for shading a plurality of draws associated with the at least one frame. Further, the shading rate for each of the plurality of bins may be associated with variable rate shading (VRS). In some aspects, mapping the density data for each of the plurality of bins to the shading rate for each of the plurality of bins may comprise: converting the density data for each of the plurality of bins to the shading rate for each of the plurality of bins. As such, GPU component 802 may convert the density data for each of the plurality of bins to the shading rate for each of the plurality of bins.

At 1012, the GPU may transmit an indication of the shading rate for each of the plurality of bins, where the indication is transmitted after the density data for each of the plurality of bins is mapped to the shading rate for each of the plurality of bins, as described in connection with the examples in FIGS. 1-8. For example, as described in 860 of FIG. 8, GPU component 802 may transmit an indication of the shading rate for each of the plurality of bins, where the indication is transmitted after the density data for each of the plurality of bins is mapped to the shading rate for each of the plurality of bins. Further, step 1012 may be performed by processing unit 120 in FIG. 1. The indication of the shading rate for each of the plurality of bins may be transmitted to at least one component in a graphics processing unit (GPU) pipeline. Also, the shading rate for each of the plurality of bins may be applied to a rendered image associated with the at least one frame.

In configurations, a method or an apparatus for graphics processing is provided. The apparatus may be a GPU, a GPU component (e.g., a component in a GPU or GPU pipeline, software for controlling a GPU, or a processor for controlling a GPU), a graphics processor, a CPU (or other central processor), an apparatus for graphics processing, a wireless communication device, and/or some other processor that may perform graphics processing. In aspects, the apparatus may be the processing unit 120 within the device 104, or may be some other hardware within the device 104 or another device. The apparatus, e.g., processing unit 120, may include means for obtaining visibility information for a set of primitives in at least one frame associated with the graphics processing, where the at least one frame includes a plurality of bins, such that at least one bin of the plurality of bins includes at least one primitive of the set of primitives. The apparatus, e.g., processing unit 120, may also include means for configuring a density map based on the visibility information for the set of primitives, where the density map includes density data associated with an amount of the set of primitives in each of the plurality of bins. The apparatus, e.g., processing unit 120, may also include means for mapping the density data for each of the plurality of bins to a shading rate for each of the plurality of bins. The apparatus, e.g., processing unit 120, may also include means for calculating the ratio or the percentage of the set of primitives in each of the plurality of bins based on the amount of the set of primitives in each of the plurality of bins. The apparatus, e.g., processing unit 120, may also include means for obtaining an indication of the set of primitives in the at least one frame from at least one component in a graphics processing unit (GPU) pipeline, where the indication is obtained before the visibility information for the set of primitives is obtained. The apparatus, e.g., processing unit 120, may also include means for transmitting an indication of the shading rate for each of the plurality of bins, where the indication is transmitted after the density data for each of the plurality of bins is mapped to the shading rate for each of the plurality of bins.

The subject matter described herein may be implemented to realize one or more benefits or advantages. For instance, the described graphics processing techniques may be used by a GPU, a GPU component, a CPU, a graphics processor, an apparatus for graphics processing, or some other processor that may perform graphics processing to implement the density driven variable rate shading techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize density driven variable rate shading techniques in order to improve memory bandwidth efficiency and/or increase processing speed at a GPU or CPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including a memory and at least one processor coupled to the memory and, based at least in part on information stored in the memory, the at least one processor is configured to: obtain visibility information for a set of primitives in at least one frame associated with the graphics processing, where the at least one frame includes a plurality of bins, such that at least one bin of the plurality of bins includes at least one primitive of the set of primitives; configure a density map based on the visibility information for the set of primitives, where the density map includes density data associated with an amount of the set of primitives in each of the plurality of bins; and map the density data for each of the plurality of bins to a shading rate for each of the plurality of bins.

Aspect 2 is the apparatus of aspect 1, where the amount of the set of primitives in each of the plurality of bins is associated with a ratio or a percentage of the set of primitives in each of the plurality of bins.

Aspect 3 is the apparatus of any of aspects 1 and 2, where the at least one processor is further configured to: calculate the ratio or the percentage of the set of primitives in each of the plurality of bins based on the amount of the set of primitives in each of the plurality of bins.

Aspect 4 is the apparatus of any of aspects 1 to 3, where the density data associated with the amount of the set of primitives in each of the plurality of bins corresponds to a density of a first amount of visible primitives of the set of primitives in each of the plurality of bins.

Aspect 5 is the apparatus of any of aspects 1 to 4, where a first shading rate for at least one first bin of the plurality of bins is different from a second shading rate for at least one second bin of the plurality of bins.

Aspect 6 is the apparatus of any of aspects 1 to 5, where the first shading rate for the at least one first bin is shaded differently from the second shading rate for the at least one second bin during a rendering pass at a graphics processing unit (GPU).

Aspect 7 is the apparatus of any of aspects 1 to 6, where the at least one processor is further configured to: obtain an indication of the set of primitives in the at least one frame from at least one component in a graphics processing unit (GPU) pipeline, where the indication is obtained before the visibility information for the set of primitives is obtained.

Aspect 8 is the apparatus of any of aspects 1 to 7, where the at least one processor is further configured to: transmit an indication of the shading rate for each of the plurality of bins, where the indication is transmitted after the density data for each of the plurality of bins is mapped to the shading rate for each of the plurality of bins.

Aspect 9 is the apparatus of any of aspects 1 to 8, where the shading rate for each of the plurality of bins is applied to a rendered image associated with the at least one frame.

Aspect 10 is the apparatus of any of aspects 1 to 9, where the indication of the shading rate for each of the plurality of bins is transmitted to at least one component in a graphics processing unit (GPU) pipeline.

Aspect 11 is the apparatus of any of aspects 1 to 10, where the shading rate for each of the plurality of bins is associated with a quality level for shading a plurality of draws associated with the at least one frame.

Aspect 12 is the apparatus of any of aspects 1 to 11, where the shading rate for each of the plurality of bins is associated with variable rate shading (VRS).

Aspect 13 is the apparatus of any of aspects 1 to 12, where to configure the density map based on the visibility information, the at least one processor is configured to: generate the density map based on the visibility information.

Aspect 14 is the apparatus of any of aspects 1 to 13, where to map the density data for each of the plurality of bins to the shading rate for each of the plurality of bins, the at least one processor is configured to: convert the density data for each of the plurality of bins to the shading rate for each of the plurality of bins.

Aspect 15 is the apparatus of any of aspects 1 to 14, where the visibility information for the set of primitives is associated with a binning pass for the at least one frame.

Aspect 16 is the apparatus of any of aspects 1 to 15, where the at least one frame corresponds to at least one graphics workload for the graphics processing.

Aspect 17 is the apparatus of any of aspects 1 to 16, where the apparatus is a wireless communication device, further including at least one of an antenna or a transceiver coupled to the at least one processor.

Aspect 18 is a method of graphics processing for implementing any of aspects 1 to 16.

Aspect 19 is an apparatus for graphics processing including means for implementing any of aspects 1 to 16.

Aspect 20 is a computer-readable medium (e.g., a non-transitory computer-readable medium) storing computer executable code, the code when executed by at least one processor causes the at least one processor to implement any of aspects 1 to 16.

What is claimed is:

1. An apparatus for graphics processing, comprising:
   a memory; and
   at least one processor coupled to the memory and, based at least in part on information stored in the memory, the at least one processor is configured to:
   obtain visibility information for a set of primitives in at least one frame associated with the graphics processing, wherein the at least one frame includes a plurality of bins, such that at least one bin of the plurality of bins includes at least one primitive of the set of primitives;
   configure a density map based on the visibility information for the set of primitives, wherein the density map includes density data associated with an amount of the set of primitives in each of the plurality of bins; and
   map the density data for each of the plurality of bins to a shading rate for each of the plurality of bins.

2. The apparatus of claim 1, wherein the amount of the set of primitives in each of the plurality of bins is associated with a ratio or a percentage of the set of primitives in each of the plurality of bins.

3. The apparatus of claim 2, wherein the at least one processor is further configured to:
   calculate the ratio or the percentage of the set of primitives in each of the plurality of bins based on the amount of the set of primitives in each of the plurality of bins.

4. The apparatus of claim 1, wherein the density data associated with the amount of the set of primitives in each of the plurality of bins corresponds to a density of a first amount of visible primitives of the set of primitives in each of the plurality of bins.

5. The apparatus of claim 1, wherein a first shading rate for at least one first bin of the plurality of bins is different from a second shading rate for at least one second bin of the plurality of bins.

6. The apparatus of claim 5, wherein the first shading rate for the at least one first bin is shaded differently from the second shading rate for the at least one second bin during a rendering pass at a graphics processing unit (GPU).

7. The apparatus of claim 1, wherein the at least one processor is further configured to:
   obtain an indication of the set of primitives in the at least one frame from at least one component in a graphics processing unit (GPU) pipeline, wherein the indication is obtained before the visibility information for the set of primitives is obtained.

8. The apparatus of claim 1, wherein the at least one processor is further configured to:
transmit an indication of the shading rate for each of the plurality of bins, wherein the indication is transmitted after the density data for each of the plurality of bins is mapped to the shading rate for each of the plurality of bins.

9. The apparatus of claim 8, wherein the shading rate for each of the plurality of bins is applied to a rendered image associated with the at least one frame.

10. The apparatus of claim 8, wherein the indication of the shading rate for each of the plurality of bins is transmitted to at least one component in a graphics processing unit (GPU) pipeline.

11. The apparatus of claim 1, wherein the shading rate for each of the plurality of bins is associated with a quality level for shading a plurality of draws associated with the at least one frame.

12. The apparatus of claim 1, wherein the shading rate for each of the plurality of bins is associated with variable rate shading (VRS).

13. The apparatus of claim 1, wherein to configure the density map based on the visibility information, the at least one processor is configured to: generate the density map based on the visibility information.

14. The apparatus of claim 1, wherein to map the density data for each of the plurality of bins to the shading rate for each of the plurality of bins, the at least one processor is configured to: convert the density data for each of the plurality of bins to the shading rate for each of the plurality of bins.

15. The apparatus of claim 1, wherein the visibility information for the set of primitives is associated with a binning pass for the at least one frame.

16. The apparatus of claim 1, further comprising at least one of an antenna or a transceiver coupled to the at least one processor, wherein the at least one frame corresponds to at least one graphics workload for the graphics processing.

17. A method of graphics processing, comprising:
obtaining visibility information for a set of primitives in at least one frame associated with the graphics processing, wherein the at least one frame includes a plurality of bins, such that at least one bin of the plurality of bins includes at least one primitive of the set of primitives;
configuring a density map based on the visibility information for the set of primitives, wherein the density map includes density data associated with an amount of the set of primitives in each of the plurality of bins; and
mapping the density data for each of the plurality of bins to a shading rate for each of the plurality of bins.

18. The method of claim 17, wherein the amount of the set of primitives in each of the plurality of bins is associated with a ratio or a percentage of the set of primitives in each of the plurality of bins.

19. The method of claim 18, further comprising:
calculating the ratio or the percentage of the set of primitives in each of the plurality of bins based on the amount of the set of primitives in each of the plurality of bins.

20. The method of claim 17, wherein the density data associated with the amount of the set of primitives in each of the plurality of bins corresponds to a density of a first amount of visible primitives of the set of primitives in each of the plurality of bins.

21. The method of claim 17, wherein a first shading rate for at least one first bin of the plurality of bins is different from a second shading rate for at least one second bin of the plurality of bins.

22. The method of claim 21, wherein the first shading rate for the at least one first bin is shaded differently from the second shading rate for the at least one second bin during a rendering pass at a graphics processing unit (GPU).

23. The method of claim 17, further comprising:
obtaining an indication of the set of primitives in the at least one frame from at least one component in a graphics processing unit (GPU) pipeline, wherein the indication is obtained before the visibility information for the set of primitives is obtained.

24. The method of claim 17, further comprising:
transmitting an indication of the shading rate for each of the plurality of bins, wherein the indication is transmitted after the density data for each of the plurality of bins is mapped to the shading rate for each of the plurality of bins.

25. The method of claim 24, wherein the shading rate for each of the plurality of bins is applied to a rendered image associated with the at least one frame, and wherein the indication of the shading rate for each of the plurality of bins is transmitted to at least one component in a graphics processing unit (GPU) pipeline.

26. The method of claim 17, wherein the shading rate for each of the plurality of bins is associated with a quality level for shading a plurality of draws associated with the at least one frame, and wherein the shading rate for each of the plurality of bins is associated with variable rate shading (VRS).

27. The method of claim 17, wherein configuring the density map based on the visibility information comprises: generating the density map based on the visibility information, and wherein mapping the density data for each of the plurality of bins to the shading rate for each of the plurality of bins comprises: converting the density data for each of the plurality of bins to the shading rate for each of the plurality of bins.

28. The method of claim 17, wherein the visibility information for the set of primitives is associated with a binning pass for the at least one frame, wherein the at least one frame corresponds to at least one graphics workload for the graphics processing.

29. An apparatus for graphics processing, comprising:
means for obtaining visibility information for a set of primitives in at least one frame associated with the graphics processing, wherein the at least one frame includes a plurality of bins, such that at least one bin of the plurality of bins includes at least one primitive of the set of primitives;
means for configuring a density map based on the visibility information for the set of primitives, wherein the density map includes density data associated with an amount of the set of primitives in each of the plurality of bins; and
means for mapping the density data for each of the plurality of bins to a shading rate for each of the plurality of bins.

30. A non-transitory computer-readable medium storing computer executable code for graphics processing, the code when executed by a processor causes the processor to:
obtain visibility information for a set of primitives in at least one frame associated with the graphics processing, wherein the at least one frame includes a plurality of bins, such that at least one bin of the plurality of bins includes at least one primitive of the set of primitives;
configure a density map based on the visibility information for the set of primitives, wherein the density map includes density data associated with an amount of the set of primitives in each of the plurality of bins; and
map the density data for each of the plurality of bins to a shading rate for each of the plurality of bins.

* * * * *